United States Patent Office 3,725,036
Patented Apr. 3, 1973

3,725,036
PROCESS FOR MAKING SMALL PARTICLES
John E. Ehrreich, Wayland, and Adrian R. Reti, Cambridge, Mass., assignors to Graham Magnetics, Inc., Graham, Tex.
No Drawing. Filed Mar. 24, 1971, Ser. No. 127,850
Int. Cl. B22f 9/00; H01f 1/06, 1/09
U.S. Cl. 75—.5 A
15 Claims

ABSTRACT OF THE DISCLOSURE

A process for making metallic particles of sub-micron particle size wherein a soluble metallic salt is reacted with a strong reducing agent in a solvent medium which, in addition to the aforesaid reactants, comprises a silane solute which has a strong chemical affinity for the newly-formed metallic surface. The invention also encompasses products formed by the aforesaid process, e.g. iron and cobalt powders characterized by a surprisingly high bulk density when compared to metal particles prepared by somewhat similar processes.

BACKGROUND OF THE INVENTION

This invevntion relates to making small metallic particles characterized by extraordinary small particle size.

In recent years, a considerable amount of inventive effort has been expended in an attempt to obtain uniformly-shaped and sized, yet very small, particles of metallic substances in a readily dispersible form. Small metallic particles have a large number of uses. Their high surface area makes them useful in catalytic reactions utilizing the particular metal. Such metal powders formed of magnetic metals can be utilized in compounding mixtures for use in making "compressed powder" or "sintered-powder" magnets. Upon suitable after-treatment, such small magnetic particulate materials can be used, with a suitable segregating matrix, in coating tapes for use in magnetic processes used in information storage and the like. Moreover, small metallic particles are also useful in manufacture of pyrotechnic devices and can be consumed in high-energy fuel systems.

Some of the previous methods of making small particles have included such processes as forming oxide particles and then reducing them by processes such as that disclosed by Robbins et al. in Journal of the Electrochemical Society, volume 117, page 137; or by electrodeposition of the metal as described in U.S. Pats. 3,073,-762 and 3,198,716; or by deposition of the metal from a metal carbonyl or the like. All of these methods are expensive, do not provide a means to control particle size readily—especially in the sub micron range—and usually result in production of particles which have other than an optimum shape for a particular use. Such processes tend to provide particles with a relatively high tendency to agglomerate with one another. The effect of such agglomeration reduces the value of characteristics which would be expected from the material on the basis of the basic particle size thereof.

U.S. Pat. 3,206,338 to Miller and Oppegard contains a description of a process for forming very small metal particles by reducing a metal salt with a metalborohydride while maintaining a magnetic field about the reaction zone. This process, although yielding very small uniform particles, does not provide the degree of non-agglomeration sought by the instant inventors. Thus the materials prepared thereby are rather fluffy and have relatively low bulk densities. Moreover, the process taught by Miller and Oppegard results in the production of excessively pyrophoric powders when it is used to make powders of the more readily oxidizable metals. It is also noted that there is a tendency for very small particles formed by reduction-from-solution type processes to have an excessive oxide content and consequently have reduced reactivity.

SUMMARY OF THE INVENTION

It is an object of the invention to provide a novel and improved means for making small, uniform, metallic particles.

Another object of the invention is to provide such metallic particles in substantially discrete form as opposed to highly agglomerated form, and thereby preserve more perfectly those physical properties which are associated with a mass of individual particles.

A further object of the invention is to provide a relatively simple process for making such discrete particles which process does not require the use of highly expensive apparatus nor entail the use of toxic gases.

A particular object of the invention is to provide means to controllably inhibit the growth of metallic nuclei formed by the reduction of a metallic salt in a liquid medium.

A further object of the invention is to provide a means for making a pyrophoric metallic powder of very small particle size.

Another object of the invention is to provide a small metal particle susceptible to enhancement of its magnetic properties by thermal means without undue agglomeration of the particles.

Another object of the invention is to provide metal powders of controlled pyrophoricity.

Other objects of the invention will be obvious to those skilled in the art on reading the instant application.

The above objects have been substantially achieved by the reduction of metallic salts in the presence of a metal-surface passivating agent. This reduction is carried out in a liquid phase in which both the metallic salt and passivating agent have substantial solubility. The products are free-flowing powders having a bulk density of about a magnitude greater than materials prepared by analogous processes but without silane.

By the designation of silane as a passivating agent, it is not meant to imply that the particular passivating agent performs its passivating function without any significant chemical change. Indeed the majority of compounds suitable for use as passivating agents will first be hydrolized, or otherwise modified by interaction within the reaction medium, before producing an activity-passivating moiety, i.e. a moiety having the suitable electronic character to seek out and neutralize the active growth sites on the metallic particles being formed.

The reducing agent which is used can be any strong reducing agent permitting the metal salt to be reduced to the metal itself. Metal borohydrides are particularly useful in aqueous media at moderate temperatures. Among such metal borohydrides are the alkali metal borohydrides such as sodium and potassium borohydrides, the alkaline earth borohydrides such as calcium borohydride, magnesium borohydride, and the like.

The precise particle size of the metallic particles being formed will, in part, depend on the concentration, temperature, and degree of agitation of the fluid mass in which the reduction is accomplished. However, the particle size is also influenced by the choice of a proper passivating agent which must be characterized by a moderate activity in solution whereby it does not react so quickly with newly-formed metal that one obtains little more than a organometallic compound, or metallic oxide dust, yet does combination quickly enough with active-sites on a newly-forming metal surface to prevent the growth of metal particles of excessive size.

The particles formed by the process described herein have the surprising characteristic of becoming more magnetic rather than less magnetic when subjected to elevated temperatures, e.g. in the 300–650° range in a non-oxidizing atmosphere.

Silanes, especially those having molecular weights of from about 100 to 500, are particularly desirable passivating agents when one wishes to produce, at moderate temperatures, dispersions of metallic particles in the submicron range, for example those having maximum average diameters below 0.5 micron.

As pointed out in U.S. Pat. 3,206,338, reduction processses of the general type described herein may be carried out within a strong magnetic field. It has now been discovered that, when no magnetic field is involved, and when the particular process improvements described herein are utilized, particles of surprisingly little magnetic activity can be manufactured. This is believed to be a consequence of the use of the passivating agent to inhibit growth of the metal particles. However, often it will be desirable to operate within a magnetic field (or, alternatively, post-treat the particles with heat) to achieve desired magnetic properties.

The precise mechanism by which the passivating agent operates is not precisely known. Indeed different passivating agents may achieve their results by different chemical and physical effects within the reaction system. Without any intention of being bound by the theory, it is believed that the passivating agent provides a moderately reactive chemical group, such as the hydrolysis product of a silane molecule, which group tends to seek a site on a surface of the growing metal particle which site is, if only fleetingly, of the opposite electro-negative charge from the aforesaid hydrolysis product. The passivating group attaches itself to the metal particle and, either by directly pre-empting the position at which a metal ion would have despited or by a steric hindrance with such a site, tends to stop the growth of the metal particle at an early stage in its growth.

In any event, the passivating agent must be sufficiently active to complete its inhibiting action before the metal particles grow excessively in size. For this reason, among others, macromolecular passivating agents do not seem to be generally effective in manufacture of metal particles of very small size.

Metallic salts may be selected from a wide range of materials. The efficacy of the process is limited, as will be generally understood, to those metals susceptible to reduction by hydrogen. The more important of these are iron and cobalt. The more convenient salts are the common commercial grades of sulfates, nitrates, halides such as bromides and chlorides, salts of organic acids, and the like. It is not believed any special advantage can be achieved by use of more expensive metal salts.

It is often advantageous to heat treat particles produced by the above described process in order to modify the basic properties thereof. Of course, this heat treatment must be carried out by a means which will largely preserve the special attribute of the particulate product, i.e. a surprisingly low degree of agglomeration and interaction between discrete particles.

Very fine particles of refractory materials, i.e. materials having a melting or decomposition points above the point at which the metal particles undergo significant physical modification, can be mixed into the metal particles prior to the heat-treating step. This type of mixing has been found to minimize any agglomeration of the metal particles during heat treatment.

The particles mixed into the metal particles must be separable therefrom by some distinct physical or chemical characteristic such as solubility or density. In practice, this presents no difficulty since such commonly available highly soluble refractory materials such as sodium chloride may be readily leached out of admixture with metal powders. Many refractory materials, although non-soluble, can be readily separated from metallic particles by known centrifugal techniques.

The process using silane passivating agents according to the invention allows production of powders having unusually small particles sizes, below 1,000 angstroms and even below 100 angstroms, and excellent size and shape uniformity. However, it also provides a means for making small metallic powders of reduced pyrophoricity and means for providing relatively dense metal powders having unusually high apparent densities in relation to their very small particle sizes. Sub micron particles with apparent bulk densities of 0.3 to 0.8 gm./cc. can be prepared (using iron as a standard for such a measurement—cobalt would differ because of its differing density only).

The pyrophoric nature of the more-readily oxidizible metals can be enhanced by working with such silane-attacking solvents as tetrahydrofuran or the like.

On advantage achieved by use of a passivating agent is to enable the production of a small metallic powder which, despite its small size, can be readily converted to a pyrophoric form by washing with a suitable passivator-removing substance. For example, a silane-bearing material can be washed with tetrahydrofuran or the like to produce a pyrophoric powder having an extraordinary low particle size. Powders having such particle sizes have ordinarily had such a "thick" protective layer of an oxide or have had so little real metallic content that they have not been pyrophoric and therefore have not been efficacious for compounding into pyrotechnic compositions, for use in high-energy fuel systems, or like applications requiring a significant quantity of quickly-oxidizable metal surface.

When the process of the invention is carried out within a magnetic field, the force of the field should be at least about 500 oersteds to contribute any important magnetic properties. Moreover, it is desirable to use a passivating agent of relatively low activity in the salt solution so that somewhat larger particles will be formed during the process.

Illustrative Examples of the Invention

In order to point out more fully the nature of the present invention, the specific embodiments of the present process and products produced thereby are set forth below:

WORKING EXAMPLE 1

A 0.5 molar, aqueous solution of cobalt chloride was prepared. A quantity of 25 drops of a vinyl silane, vinyl-triacetoxysilane having a molecular weight of 232 and sold under the trade designation Z6075 by Dow Corning Corporation, was added to 100 milliliters of this aqueous solution using a conventional eye dropper.

In a separate vessel 2.0 grams of sodium borohydride was dissolved in 50 milliliters of water.

Thereupon, using a magnetically-actuated mixing bar to maintain adequate agitation, the borohydride solution was added dropwise to the cobalt chloride solution. Care was taken to add the borohydride slowly enough to allow the substantially complete reaction of the borohydride in each drop before adding a subsequent drop.

The reaction resulted in a very fine dispersion of cobalt which was relatively free from agglomeration of individual metal particles.

When the same reaction was run without the use of the silane a highly conglomerated cobalt dispersion was obtained which settled rapidly rather than remained in dispersion.

WORKING EXAMPLE 2

The procedure of Example 1 was followed excepting that an amino silane, n-beta aminoethyl-gamma-aminopropyl trimethoxysilane, having a M.W. of 222 and sold under the trade designation Z6020 by Dow Corning Corporation, was used instead of the vinyl silane of Example 1.

The resulting cobalt particles were similarly dispersed to those made in presence of the vinyl silane. The dispersion was clearly distinguishable as having relatively little agglomeration as compared to the dispersion prepared without using a passivating agent.

WORKING EXAMPLE 3

The procedure of Example 2 was followed excepting the amino silane was added to the borohydride mixture instead of the cobalt salt. The product was similar to that obtained in Example 2.

WORKING EXAMPLE 4

The procedure of Example 3 was followed excepting that only five drops of amino silane were added to the borohydride solution.

The resulting dispersion of cobalt particles was filtered, washed several times with water and air dried at about 30° F.

The resulting cobalt powder was extremely fine and in a substantially non-agglomerated form.

WORKING EXAMPLE 5

Two grams of amino silane was added to a solution of 15 grams sodium borohydride in 100 milliliters of water. This borohydride solution was added slowly to 340 milliliters of a one molar cobalt chloride solution as this latter solution was agitated in a Waring Blendor.

The resulting precipitate of cobalt metal was washed with water several times, then washed with tetrahydrofuran. A magnet was used to separate the powder from the tetrahydrofuran.

Thereupon the material was dried in a vacuum oven. The resulting, very fine, relatively non-agglomerated material was relatively pyrophoric compared to those materials prepared according to the first four working examples.

WORKING EXAMPLE 6

A quantity of 9.9 grams of $FeCl_2 \cdot 4H_2O$ was dissolved in 100 milliliters of water.

Two grams of sodium borohydride and five drops of amino silane was dissolved in 50 milliliters of water in a separate vessel.

The iron-bearing solution was agitated with a magnetic stirrer and the borohydride solution was slowly added thereto. A fine dispersion of iron powder was obtained.

After being filtered and washed four times with distilled water, the iron powder was dispersed in acetone to aid the drying thereof. The powder was then separated from acetone by use of a magnet and air dried at 30° F.

When the foregoing procedure was followed without use of a passivating agent, an iron powder was obtained which had agglomerated into a fluffy material of relatively low apparent density.

The bulk density of the material prepared with the passivating agent was compared to the bulk density of the material prepared without the passivating agent:

With: 0.53 gm./cc.
Without: 0.06 gm./cc.

WORKING EXAMPLE 7

The general procedure described in Example 1 is carried out in a magnetic field of about 1500 oersteds, i.e. in a small glass vessel placed between the poles of a permanent magnet which contributes a nominal field strength of about 5000 oersteds.

One gram of vinyl silane is used as a passivating agent.

The resulting material is magnetic, and relatively non-pyrophoric.

It is of course to be understood that the foregoing examples are intended to be illustrative and that numerous changes can be made in the reactant proportions, and conditions set forth therein without departing from the spirit of the invention as defined in the appended claims.

What is claimed is:

1. In a process for making small metallic particles, in solution, by reaction of a reducing agent with a salt of a metal, the improvement comprising the steps of
    (a) introducing a passivating agent into said solution;
    (b) maintaining a quantity of said passivating agent in said solution effective to inhibit growth of metal particles until said reducing reaction is completed.
2. A process as defined in claim 1 wherein said reducing agent is a metal borohydride.
3. A process as defined in claim 1 wherein said metal salt is a water-soluble salt of a ferromagnetic metal, and wherein said solution is an aqueous solution.
4. A process as defined in claim 1 wherein said passivating agent is characterized by formation in solution of a radical having an electronic attraction for newly formed surfaces of said metal particles.
5. A process as defined in claim 1 wherein said passivating agent is a silane.
6. A process as defined in claim 5 wherein said passivating agent is a water-soluble silane.
7. A process as defined in claim 1 comprising the further step of removing said passivating agent from said metal particle, thereby providing a pyrophoric powder.
8. A process as defined in claim 1 wherein said process is carried out in a magnetic field of above 500 oersteds.
9. A process as defined in claim 1 comprising the additional step of heat treating said metal in a non-oxidizing atmosphere as a means to enhance the magnetic properties thereof.
10. A process for preventing the agglomeration of very small metallic particles and providing a mass of such particles in a form exhibiting a very high ratio of surface area and yet maintaining a relatively high bulk density, said process comprising the steps of
    (a) reducing a solution of metal salts with a metallic borohydride solution as a reducing agent,
    (b) simultaneously maintaining a quantity of a passivating agent dissolved in the reaction medium, and
    (c) recovering metallic particles formed by the reducing reaction.
11. A process as defined in claim 10 wherein said passivating agent forms an oxidation-resistant protective barrier on said particle, thereby contributing oxidation-resistance to the metallic particles.
12. A process as defined in claim 10 wherein said passivating agent is a silane.
13. A process as defined in claim 12, comprising the additional step of removing said silane from the surface of said metal, leaving a pyrophoric metal composition.
14. A process as defined in claim 10 wherein said metal is cobalt, iron or a mixture thereof.
15. A process as defined in claim 13 wherein said metal is cobalt, iron or a mixture thereof.

References Cited

UNITED STATES PATENTS 3,661,556    5/1972    Jolley et al. _____ 75—0.5 AA

WAYLAND W. STALLARD, Primary Examiner

U.S. Cl. X.R.

75—0.5 AA, 0.5 AB; 148—105